(12) United States Patent
McBrien

(10) Patent No.: US 10,756,531 B2
(45) Date of Patent: Aug. 25, 2020

(54) VOLTAGE DIFFERENTIAL TRANSDUCER (VDT) FAULT DETECTION

(71) Applicant: Hamilton Sundstrand Corporation, Charlotte, NC (US)

(72) Inventor: Gary M. McBrien, South Glastonbury, CT (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 329 days.

(21) Appl. No.: 15/939,451

(22) Filed: Mar. 29, 2018

(65) Prior Publication Data

US 2019/0305542 A1 Oct. 3, 2019

(51) Int. Cl.
| | |
|---|---|
| *H02H 7/04* | (2006.01) |
| *H02H 3/08* | (2006.01) |
| *G01D 3/08* | (2006.01) |
| *G01D 5/22* | (2006.01) |

(52) U.S. Cl.
CPC .............. *H02H 7/04* (2013.01); *G01D 3/08* (2013.01); *G01D 5/2291* (2013.01); *H02H 3/08* (2013.01)

(58) Field of Classification Search
CPC H02H 7/04; H02H 7/045; H02H 3/08; G01D 3/08; G01D 5/2291
See application file for complete search history.

(56) References Cited

U.S. PATENT DOCUMENTS

| | | | | |
|---|---|---|---|---|
| 5,095,399 A | * | 3/1992 | Terada | H02H 3/28 361/44 |
| 7,061,183 B1 | * | 6/2006 | Ball | H05B 41/2822 315/255 |
| 7,138,794 B1 | * | 11/2006 | Cook | G01D 1/18 324/207.18 |
| 8,712,710 B2 | * | 4/2014 | Nair | G01D 5/24457 702/65 |
| 9,214,802 B2 | | 12/2015 | Harvey et al. | |
| 9,528,815 B2 | | 12/2016 | Hess | |
| 9,638,735 B2 | | 5/2017 | Reese et al. | |
| 9,817,061 B2 | * | 11/2017 | Reese | G01R 31/2829 |
| 10,401,395 B2 | * | 9/2019 | Cabret | G01R 17/00 |

(Continued)

FOREIGN PATENT DOCUMENTS

| | | |
|---|---|---|
| WO | 2005121708 A1 | 12/2005 |
| WO | 2015153158 A1 | 10/2015 |

OTHER PUBLICATIONS

European Search Report, Application No. 19162217.4-022, dated Jul. 19, 2019, 8 pages.

*Primary Examiner* — Adolf D Berhane
(74) *Attorney, Agent, or Firm* — Cantor Colburn LLP

(57) ABSTRACT

Embodiments of the invention include systems and techniques for implementing voltage differential transducer (VDT) fault detection. Embodiments include a computing resource electrically coupled to an AC power supply, a VDT including a primary winding and a set of secondary windings, wherein the VDT is electrically coupled to the AC power supply. Embodiments also include a current sensing circuit electrically coupled to the AC power supply and the VDT, and a signal processor electrically coupled to an output of the VDT and the computing resource, the signal processor providing a signal indicative of a voltage differential of the set of secondary windings of the VDT, that is used by the computing resource to make an error determination.

16 Claims, 4 Drawing Sheets

200

(56) References Cited

U.S. PATENT DOCUMENTS

| | | |
|---|---|---|
| 2005/0046593 A1 | 3/2005 | Tulpule et al. |
| 2007/0146942 A1* | 6/2007 | Covington ............... G01D 3/08 361/38 |
| 2017/0153126 A1* | 6/2017 | Wu ....................... F01D 17/145 |
| 2017/0248648 A1 | 8/2017 | Wingerter |

* cited by examiner

VOLTAGE DIFFERENTIAL TRANSDUCER (VDT) FAULT DETECTION

BACKGROUND

The present disclosure relates generally to fault detection devices and systems, and more particularly to voltage differential transducer fault detection.

Devices such as voltage differential transducers (VDT) are used in a number of automation, measurement and control systems. In particular, these devices are used to convert energy from one form to another form. For example, a physical quantity of movement or displacement can be converted into an electrical signal, where a shaft or rod of the voltage differential transducer is moved by a physical force causing a change in magnetic field. This change is used to provide an output signal that can indicate a position of an object. Voltage differential transducers can include different types such as a linear voltage differential transducer (LVDT) measures linear displacement and a rotary voltage differential transducer measures (RVDT) rotary displacement of an object.

BRIEF DESCRIPTION

According to one embodiment, a system for implementing voltage differential transducer (VDT) fault detection is shown. The system includes a computing resource electrically coupled to an AC power supply, a VDT including a primary winding and a set of secondary windings, wherein the VDT is electrically coupled to the AC power supply, a current sensing circuit electrically coupled to the AC power supply and the VDT, and a signal processor electrically coupled to an output of the VDT and the computing resource, the signal processor providing a signal indicative of a voltage differential of the set of secondary windings of the VDT, that is used by the computing resource to make an error determination.

In addition to one or more of the features described above, or as an alternative, further embodiments may include wherein the AC power supply provides an excitation signal to the VDT.

In addition to one or more of the features described above, or as an alternative, further embodiments may include wherein the VDT is a linear voltage differential transducer.

In addition to one or more of the features described above, or as an alternative, further embodiments may include wherein the VDT is a rotary voltage differential transducer.

In addition to one or more of the features described above, or as an alternative, further embodiments may include wherein the AC power supply provides a sine wave as an excitation signal to the VDT.

In addition to one or more of the features described above, or as an alternative, further embodiments may include wherein each output of the secondary windings of the VDT is read independently.

In addition to one or more of the features described above, or as an alternative, further embodiments may include wherein each output of the secondary windings of the VDT is read as a series combination.

In addition to one or more of the features described above, or as an alternative, further embodiments may include wherein the current sensing circuit is coupled to a return line of the primary winding of the VDT.

According to another embodiment, a method for voltage differential transducer (VDT) fault detection is shown. The method includes transmitting a control signal to provide an excitation signal, sensing the excitation signal, receiving a signal from a signal processor, wherein the signal is indicative of a voltage differential of a set of secondary windings of a VDT, that is used to make an error determination, comparing the excitation signal provided to the VDT to the signal received from the signal processor, and transmitting an alert based at least in part on the comparison.

In addition to one or more of the features described above, or as an alternative, further embodiments may include wherein the comparing is based at least in part on an excitation current.

In addition to one or more of the features described above, or as an alternative, further embodiments may include wherein the excitation current is sensed at a return line of a primary winding of the VDT.

In addition to one or more of the features described above, or as an alternative, further embodiments may include wherein the output signal is based on an output of a linear voltage differential transducer.

In addition to one or more of the features described above, or as an alternative, further embodiments may include wherein the output signal is based on an output of a rotary voltage differential transducer.

In addition to one or more of the features described above, or as an alternative, further embodiments may include setting a limit based on an excitation current.

In addition to one or more of the features described above, or as an alternative, further embodiments may further include reading each output of the secondary windings of the VDT independently.

In addition to one or more of the features described above, or as an alternative, further embodiments may further include reading each output of the secondary windings of the VDT as a series combination.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Traditionally, the error experienced by voltage differential transducers (VDT) is determined by comparing the voltage differential of the output coils or windings to known voltage limits provided at the input of the VDT.

During normal operation, an excitation signal is provided to the VDT sensor and is measured by the system. The pair of coil voltages provides information to ascertain the position of the VDT sensor. In the event that either coil fails completely, the failure is readily ascertainable. However, in the event where one or both coils have a small error, the sum of the output voltages of the coils can be compared to the excitation voltage to determine the current operational state. If the state falls outside of the acceptable range of the operational limits a fault is identified.

However, issues can arise before a fault is triggered and realized in the actual operation of the system. For example, the VDT can operate outside of its operational limits for a period of time as the device or system transitions to a completely failed state. During failure no output signal may be provided to the system and/or an output signal that is in error may be provided.

Typically VDT suppliers specify the operational relationship between the excitation voltage and the sum of the two output voltages of the VDT. However, the behavior of the coil sum voltage varies over a wide range of temperatures during operation. During operation of the VDT, generally the temperature is not known. Since in many cases the temperature is not known, the alarm limits for the VDT and system are configured over a large range that is outside the range of the coil sum voltage to prevent the indication of a fault under normal operation (described below with reference to FIG. 3). In the event an alarm limit is exceeded it is unknown if it occurred due to a change in operational temperature or a malfunctioning coil in the VDT.

In one or more embodiments of the invention, an additional circuit function and processing method is added to the circuit. The current sensing circuitry is added to the return line of the excitation part of the circuitry. When the excitation voltage is applied, the current sensing circuitry and processing allows for determining the excitation coil current. The techniques described herein uses the excitation coil current to determine an error state and configure the error limits for detecting a fault in the system.

This provides a technique to quickly detect small errors in the VDT sensor or circuitry's behavior before the circuit completely fails. The techniques described herein determine an error based on comparing the coil sum of the output voltages with the excitation current. Systems that are monitoring or analyzing data from the VDT sensor are provided the opportunity to take corrective action and minimize system malfunction.

Figure 1:
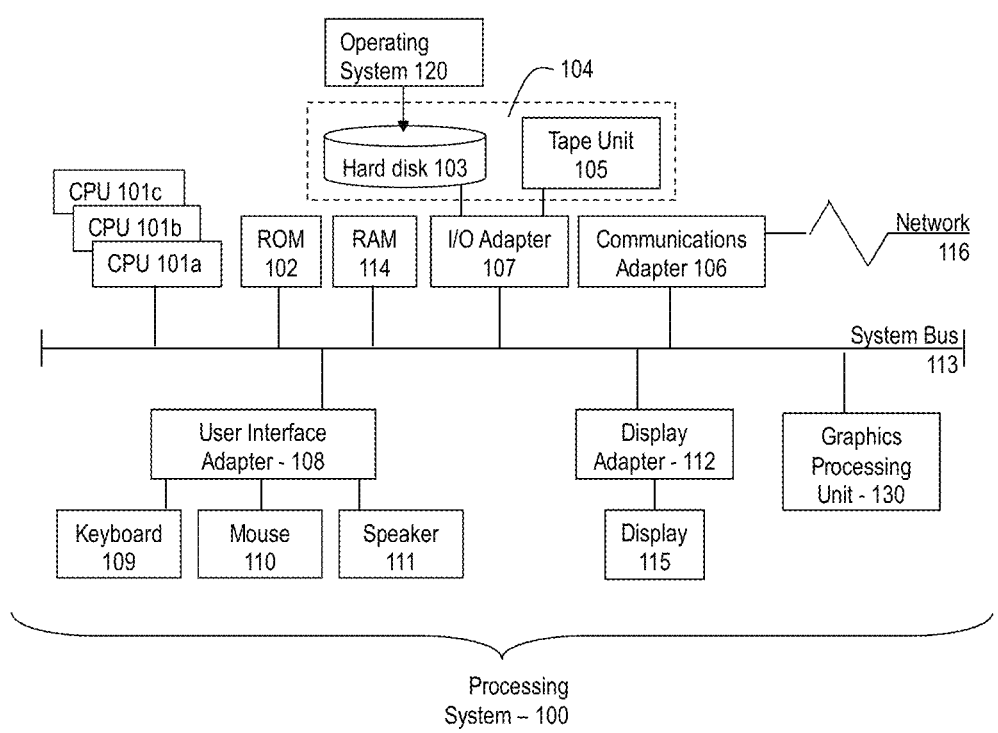
FIG. 1 depicts a processing system for implementing the teachings herein.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In one or more embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 1.

Figure 2:
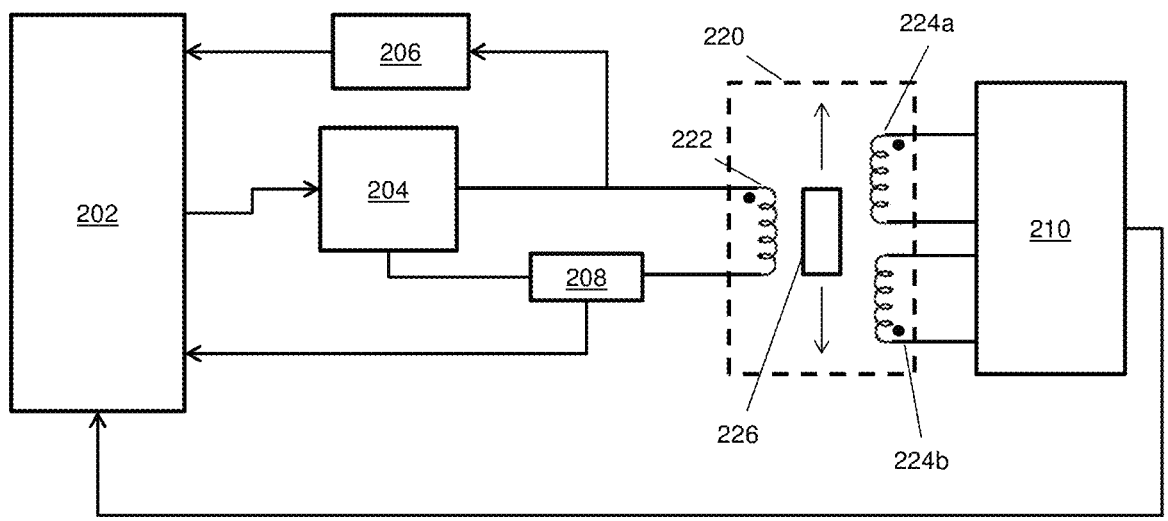
FIG. 2 depicts a variable differential transducer (VDT) and system for fault detection in accordance with one or more embodiments of the invention.

Now referring to FIG. 2, a diagram 200 of a system and VDT sensor for fault detection in accordance with one or more embodiments of the invention is shown.

The diagram 200 includes a computing resource 202. In one or more embodiments of the invention, the computing resource 202 can be implemented by one or more components provided in the system 100 of FIG. 1. The computing resource 202 is coupled to the AC power supply 204 where the AC power supply 204 provides an excitation signal to the VDT 220. The AC power supply 204 is configured to provide the excitation signal to the VDT 220, under the control of the computing resource 202. The computing resource 202 controls the AC power supply 204 by sending a control signal to the AC power supply 204. In one or more embodiments of the invention, the excitation signal provided to the VDT 220 is a sine wave.

In one or more embodiments of the invention, the VDT 220 is one of an LVDT and/or an RVDT. A non-limiting configuration of the VDT 220 includes a primary winding 222 and secondary windings 224a, 224b. In addition, the VDT 220 includes a core or slug 226 that is movable in an axial direction based on a force applied by an object. It is to be understood that different configurations of the VDT 220 are within the scope of the invention, such as different number and/or positions of windings, different number of turns in the primary and secondary coils, different size core, etc.

The VDT 220 as shown in FIG. 2 is coupled to a signal processor 210. The signal processor 210 is configured to determine the output voltage differential between the secondary windings 224a and 224b. The output voltage of the secondary windings are based on the excitation signal provided by the AC power supply 204 and position of the core 226 in relation to the secondary windings 224a and 224b which affects the magnetic flux in the VDT 220. The signal processor 210 is configured to send the signal to the computing resource 202 for further processing.

In one or more embodiments of the invention, current sensing circuit 208 is electrically coupled to the AC power supply 204 and also coupled to the computing resource 202. The current sensing circuit 208 can be electrically coupled to a return line of the excitation portion of the circuit provided in FIG. 2 that is connected to the VDT 220 to perform the sensing to determine the excitation current provided to the VDT 220 during operation.

The system shown in FIG. 2 also includes a voltage sensing circuit 206. The voltage sensing circuit 206 as shown is configured to sample the excitation signal voltage provided to the VDT 220. The voltage sensing circuit 206 is coupled to the computing resource 202. It is to be understood the current sensing circuit 208 and the voltage sensing circuit 208 can be implemented by circuit components and configurations known in the art.

In one or more embodiments of the invention, the computing resource 202 is configured to receive and compare the signals from the signal processor 210 and the excitation current from the current sensing circuit 208. The signal received from the signal processor 210 compares the sum of the output voltages of the secondary windings 224a and 224b to the sensed excitation current. The computing resource 202 is configured to store multiple readings, perform analysis, and transmit control signals and data to components within an external to the system shown in FIG. 2. Responsive to the analysis, these signals can be compared to determine the limits at which to set an error state or threshold for the system.

Figure 3:
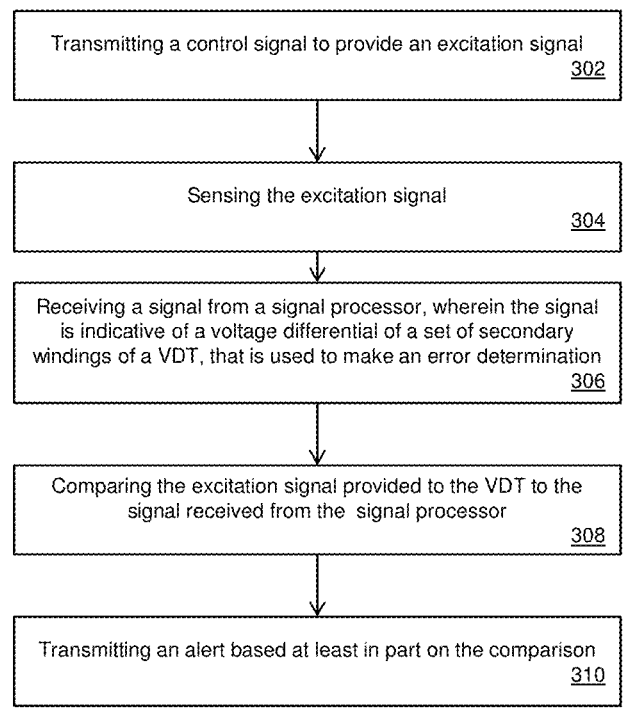
FIG. 3 depicts a flow chart for VDT fault detection in accordance with one or more embodiments of the invention.

Referring now to FIG. 3, a flow chart 300 for implementing VDT fault detection in accordance with one or more embodiments of the invention is shown.

Block 302 includes transmitting a control signal to provide an excitation signal. In one or more embodiments of the invention, the control signal is transmitted from a computing resource, such as the computing resource 202 of FIG. 2, to an AC power supply, where the AC power supply provides an excitation signal to the VDT.

Block 304 includes sensing the excitation signal. A current sensing circuit such as the current sensing circuit 208 is used to sense the excitation current provided to the VDT 220. The excitation current is used to determine an error state in the system as discussed below.

Block 306 includes receiving a signal from a signal processor, wherein the signal is indicative of a voltage differential of a set of secondary windings of a VDT, that is used to make an error determination. In one or more embodiments of the invention, the output of the VDT is received and processed by a signal processor. After processing, the signal processor transmits the data to the computing resource to be used in determining the performance of the VDT. The sum of the output voltages of the windings in the VDT is transmitted in the signal to the computing resource.

Block 308 includes comparing the excitation signal provided to the VDT to the he signal received from the signal processor. In one or more embodiments of the invention, the computing resource 202 compares the sensed excitation current to the sum of the output voltage of each of the secondary windings of the VDT.

Block 310 includes transmitting an alert based at least in part on the comparison. Responsive to the results of the comparison exceeding an acceptable operational range, transmitting an alert a user, external system, internal system, etc. to indicate the system is operating outside of its normal operating limits. The results can indicate a problem in the coils of the VDT, excitation stage, or some other component in the system.

Figure 4:
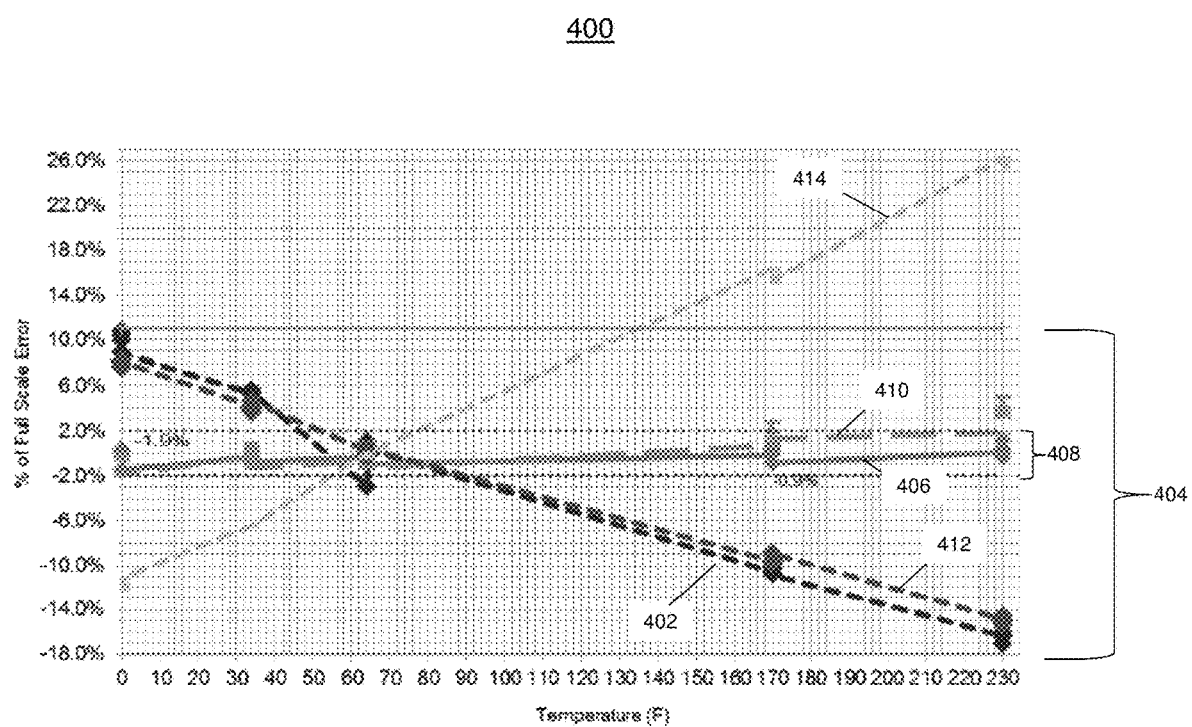
FIG. 4 depicts a VDT response over a range of temperatures in accordance with one or more embodiments of the invention.

Now referring to FIG. 4, a plot 400 of the VDT response over a range of temperatures in accordance with one or more embodiments of the invention is shown.

The plot 400 provides information of the behavior of a typical VDT over a wide range of temperatures. The x-axis provides the temperature where the unit of measurement is the Fahrenheit (F). The y-axis provides the scale of error between the coil sum error and the reference signals as discussed below.

Using conventional techniques, the error 402 of the coil sum voltage with respect to the excitation voltage is shown in plot 400 when compared to room temperature data. In many cases, the temperature is not known, therefore the fault limits for indicating a failed or failure state must be configured outside the range of the coil sum voltage in order to prevent declaring faults under normal operation. In the example shown in FIG. 4, the fault limits 404 are set based on the dashed line 402. The maximum and minimum fault limits 404 are set to approximately −18% and 12%, respectively.

In the example shown for the error 402, the limits are described as:

$$-12\% < [(V\_\text{output coil sum}) - (k1 * V\_\text{excitation})] < 18\%, \quad \text{(Eq. 1)}$$

where k1 is proportionality constant for the given VDT sensor, V_output coil sum is the output voltage differential detected by the VDT sensor, and V_excitation is the excitation voltage provided to the VDT sensor.

Using the techniques described herein, the error 406 provides the operation of the VDT sensor as it is compared to the excitation current. The fault limits when using this technique covers a much smaller range than the conventional techniques comparing the sum coil voltage to the excitation voltage. The improved fault limits 408 for the error 406 shows the maximum limit is approximately −2% and the minimum limit is approximately 2%.

In the example shown for the error 406, the limits are described as:

$$-2\% < [(V\_\text{output coil sum}) - (k2 * I\_\text{excitation})] < 2\%, \quad \text{(Eq. 2)}$$

where k2 is proportionality constant for the given VDT sensor, V_output coil sum is the output voltage differential detected by the VDT sensor, and I_excitation is the excitation current provided to the VDT sensor.

Additional information that is provided on the plot 400 include the inductance variation 410 from room temperature averages is shown. The excitation current error 412 from room temperature averages is shown. The resistance error 414 of the VDT from room temperature averages is provided.

Technical benefits and effects of the invention include improving the reliability and the determination of when a fault state has occurred or a condition leading to failure exists. The techniques provided herein allow for much tighter limits which provide the ability to detect much smaller errors due to faults in a system without triggering false fault identification.

By implementing the current sensing circuit to obtain the excitation current, an open excitation coil can be quickly detected. The sensed excitation current provides a reference that is used to configure the fault limits by which the sum of the output voltages of the coils of a VDT can be compared.

The excitation current is a much more stable predictor of the error in the system, and the prediction is now based on the current and not the voltage as in traditional configurations.

The results of the comparison can provide an indication that of condition of the system or an indication that certain component needs to be addressed or maintenance may need to be provided to the system.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A system for implementing voltage differential transducer (VDT) fault detection, comprising:
   a computing resource electrically coupled to an AC power supply;
   a VDT including a primary winding and a set of secondary windings, wherein the VDT is electrically coupled to the AC power supply;
   a current sensing circuit electrically coupled to the AC power supply and the VDT; and
   a signal processor electrically coupled to an output of the VDT and the computing resource, the signal processor providing a signal indicative of a voltage differential of the set of secondary windings of the VDT, that is used by the computing resource to make an error determination.

2. The system of claim 1, wherein the AC power supply provides an excitation signal to the VDT.

3. The system of claim 1, wherein the VDT is a linear voltage differential transducer.

4. The system of claim 1, wherein the VDT is a rotary voltage differential transducer.

5. The system of claim 1, wherein the AC power supply provides a sine wave as an excitation signal to the VDT.

6. The system of claim 1, wherein each output of the secondary windings of the VDT is read independently.

7. The system of claim 1, wherein each output of the secondary windings of the VDT is read as a series combination.

8. The system of claim 1, wherein the current sensing circuit is coupled to a return line of the primary winding of the VDT.

9. A method of voltage differential transducer (VDT) fault detection, comprising:
   transmitting a control signal to provide an excitation signal;
   sensing the excitation signal;
   receiving a signal from a signal processor, wherein the signal is indicative of a voltage differential of a set of secondary windings of a VDT, that is used to make an error determination;
   comparing the excitation signal provided to the VDT to the signal received from the signal processor; and
   transmitting an alert based at least in part on the comparison.

10. The method of claim 9, wherein the comparing is based at least in part on an excitation current.

11. The method of claim 9, wherein the excitation current is sensed at a return line of a primary winding of the VDT.

12. The method of claim 9, wherein the output signal is based on an output of a linear voltage differential transducer.

13. The method of claim 9, wherein the output signal is based on an output of a rotary voltage differential transducer.

14. The method of claim 9, further comprising setting a limit based on an excitation current.

15. The method of claim 9, further comprises reading each output of the secondary windings of the VDT independently.

16. The method of claim 9, further comprises reading each output of the secondary windings of the VDT as a series combination.

* * * * *